United States Patent
Hummel

(10) Patent No.: US 6,574,215 B2
(45) Date of Patent: Jun. 3, 2003

(54) METHOD FOR TRANSMITTING DATA PACKETS TO A NUMBER OF RECEIVERS IN A HETEROGENEOUS COMMUNICATIONS NETWORK

(75) Inventor: Heinrich Hummel, Günding (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/771,900

(22) Filed: Jan. 29, 2001

(65) Prior Publication Data

US 2001/0021190 A1 Sep. 13, 2001

Related U.S. Application Data

(63) Continuation of application No. PCT/DE99/01927, filed on Jul. 1, 1999.

(30) Foreign Application Priority Data

Jul. 28, 1998 (DE) .......................... 198 33 931

(51) Int. Cl.⁷ ............................................. H04L 12/28
(52) U.S. Cl. ...................... 370/351; 370/252; 370/390; 709/241
(58) Field of Search ................................ 370/351, 352, 370/354, 358, 360, 374, 378, 381, 389, 392, 400, 408, 256

(56) References Cited

U.S. PATENT DOCUMENTS

| | | | | |
|---|---|---|---|---|
| 4,740,954 A | * | 4/1988 | Cotton et al. ................. | 370/60 |
| 5,412,649 A | | 5/1995 | Hummel | |
| 5,574,910 A | * | 11/1996 | Bialkowski et al. ........ | 395/601 |
| 5,905,871 A | * | 5/1999 | Buskens et al. ........ | 395/200.75 |
| 6,023,733 A | * | 2/2000 | Periasamy et al. .......... | 709/241 |
| 6,052,683 A | * | 4/2000 | Irwin ........................... | 707/8 |
| 6,192,051 B1 | * | 2/2001 | Lipman et al. ............. | 370/389 |
| 6,216,167 B1 | * | 4/2001 | Momirov .................... | 709/238 |

FOREIGN PATENT DOCUMENTS

| | | |
|---|---|---|
| DE | 0579567 A2 | 1/1994 |
| DE | 4304120 C2 | 12/1994 |
| DE | 69127198 T2 | 2/1998 |

OTHER PUBLICATIONS

"Efficient multicast source routing scheme", Wen–Tsuen Chen et al., Computer Communications 16, Oct. 1993, No. 10, Jordan Hill, Oxford, England, pp. 662–666.
"Multicast Routing Extensions for OSPF", John Moy, Communications of the ACM 37, Aug. 1994, No. 8, New York, pp. 61–66 and 114.

* cited by examiner

Primary Examiner—Wellington Chin
Assistant Examiner—Brenda Pham
(74) Attorney, Agent, or Firm—Laurence A. Greenberg; Werner H. Stemer; Ralph E. Locher

(57) ABSTRACT

A first routing statement is produced in the source network node for a data packet to be transmitted (from a source network node to several destinations) based on several routing statements provided for different routing methods. The first routing statement contains branch information for branches in the route and, for each route branch in a branch, partial routing information specifying the route branch. The first routing statement also contains a cross-reference to a further routing statement. A network node involved in the transmission of the data packet is initiated by branching information (contained in a routing statement) to relay the received data packet to several network nodes denoted by the respective partial routing information. When a cross-reference to another routing statement is present, the network node initiates evaluation of the routing statement denoted by the cross-reference, and relays the received data packet to network nodes.

19 Claims, 2 Drawing Sheets

METHOD FOR TRANSMITTING DATA PACKETS TO A NUMBER OF RECEIVERS IN A HETEROGENEOUS COMMUNICATIONS NETWORK

CROSS-REFERENCE TO RELATED APPLICATIONS

This application is a continuation of copending International application Ser. No. PCT/DE99/01927, filed Jul. 1, 1999, which designated the United States.

BACKGROUND OF THE INVENTION

Field of the Invention

In modern communications networks, which comprise a large number of network nodes, data is frequently transmitted within data packets. As a rule, a so-called routing statement is thereby transmitted in association with a data packet, specifying a destination network node or a destination terminal and, possibly, also a route leading to it. Network nodes which are involved in the data transmission use the routing statement—or parts of it—to in each case determine the network node to which the received data packet is intended to be relayed, in order to pass this data packet through the communications network to a destination network node or destination terminal. If a routing statement formed in the source network node itself specifies a complete route to a destination network node or a destination terminal, this is referred to as explicit routing (or source routing). In this case, the routing statement defines, for each network node located on the route, the network node to which the data packets associated with the routing statement should in each case be relayed. An alternative method is so-called hop-by-hop routing, in which, although a routing statement formed in the source network node specifies a destination network node or a destination terminal, it does not, however, specify a route leading to it. Instead of this, the specific route is defined by those network nodes which are involved in the transmission of the data packets and which each autonomously use the routing statement and the network topology to decide the network nodes to which the data packets should in each case be relayed.

These days, a large number of routing methods are used for data transmission on the Internet. Data transmission on the Internet is based on the so-called Internet Protocol (IP) in which each data packet to be transmitted contains as the routing statement a so-called IP address which identifies the destination terminal. Although, on the one hand, such a routing statement can be produced very easily, on the other hand it requires relatively time-consuming evaluation of the IP address by network nodes which are involved in a data transmission, in order to gain the information required for relaying the data packets.

Prior art routing methods for reducing this complexity are so-called label-switching methods, in which each data packet provided with an IP address is preceded by an additional routing statement, from which the information required for relaying the data packets can be obtained very quickly. The additional routing statement in this case essentially comprises one or more identification records, which may be used as table indices for routing information tables provided in network nodes. The process of determining the information required for relaying the data packets can thus be reduced to table accesses. The original routing statement—that is to say the IP address—is still also transmitted so that data packets can also be passed on in subregions of the communications network which are not designed for a label-switching method. When handing over to such a subregion, the additional routing statement is removed once again, and the data packets are relayed on the basis of the IP address and in accordance with the Internet Protocol.

A label-switching method has been found to be particularly advantageous in conjunction with explicit routing since, in this case, route definition may be carried out only in the source network node, for example using a Dijkstra routing algorithm. In a label-switching method based on explicit routing, a sequence of identification records is combined in the routing statement, with these identification records each denoting, for each of the network nodes located on the route, that network node to which data packets associated with that routing statement should be relayed.

However, until now, label-switching methods used in conjunction with explicit routing still have a weakness. No way has yet been found for using these methods to transmit a data packet by explicit routing in parallel to a number of destination network nodes and/or destination terminals. When such a transmission mode, which is also referred to as multicast routing, were present, the range of applications of a label-switching method would be extended considerably in conjunction with explicit routing. In particular, this would allow applications such as point-to-multipoint links and conference circuits to be provided in a simpler manner than in the past.

SUMMARY OF THE INVENTION

The object of the present invention is to provide a method of transmitting data packets in a heterogeneous communications network which overcomes the above-noted deficiencies and disadvantages of the prior art devices and methods of this general kind. More specifically, the novel method should allow transmitting data packets or connection setup messages on the basis of routing statements which are intended for different routing methods, between a source network node and a number of destination network nodes and/or destination terminals.

With the above and other objects in view there is provided, in accordance with the invention, a method of transmitting data packets in a communications network from a source network node to a plurality of destinations (i.e., destination network nodes and/or destination terminals) along a branching route specified by a number of routing statements provided for different routing methods. The novel method comprises the following steps:

producing a first routing statement in a source network node, the first routing statement having branching information for each branch in the route and having partial routing information, specifying the route branch, for each route branch of the given branch; and containing a cross-reference to a further routing statement;

allocating the first routing statement to at least one data packet to be transmitted, and transmitting to network nodes immediately following the source network node on the route; and controlling with the routing statement the network node receiving the routing statement, with branching information initiating transmission of a received data packet through network nodes denoted by the partial routing information allocated to a route branch and immediately following the branch, to which, furthermore, the respective partial routing information is transmitted, with or without information in each case denoting one of these nodes, as the routing statement, and initiating, with the network node receiving the routing statement, a valuation of the further routing statement denoted by the cross-reference when a cross-reference relating to this network node is present, and the received data packet being passed on to network nodes or terminals denoted in the further routing statement.

This first method is particularly relevant for transmission of data packets.

With the above and other objects in view there is also provided, in accordance with the invention, a method of transmitting connection setup messages in a communications network from a source network node to a plurality of destinations along a branching route specified by a plurality of routing statements provided for different routing methods. The novel method comprises the following steps:

producing a first routing statement in a source network node, the first routing statement having branching information for each branch in the route and having partial routing information, specifying the route branch, for each route branch of the relevant branch; and containing a cross-reference to a further routing statement;

allocating the first routing statement to at least one connection setup message to be transmitted, and transmitting the first routing statement to network nodes immediately following the source network node on the route; and controlling a network node with the routing statement received thereby, wherein branching information initiating transmission of a received connection setup message through network nodes denoted by the partial routing information allocated to a route branch and which immediately follow the branch, to which, furthermore, the respective partial routing information is transmitted, with or without information in each case denoting one of the nodes, as the routing statement, and wherein the network node receiving the routing statement initiates a valuation of the further routing statement denoted by the cross-reference when a cross-reference relating to this network node is present, and the received connection setup message being passed on to network nodes or terminals denoted in the further routing statement.

This second method is particularly relevant for transmission of connection setup messages.

The invention and its advantages will be analyzed in the following text, primarily with respect to transmission of data packets. The statements which relate to the transmission of data packets also apply just as well, in the same sense, to transmission of connection setup messages and connection clearing messages.

A method according to the invention is essentially carried out by routing devices in network nodes which are involved in the transmission of data packets. One or more routing statements which are allocated to a data packet to be transmitted are evaluated in each of these routing devices, and the data packet is passed on as a function of this.

A network node to which the data packet is to be passed on by a routing device is defined by relaying information contained in the routing statement. This relaying information may, for example, comprise information (for example an IP address) identifying this network node, an identification record known in conjunction with label-switching methods, or information which identifies an output port via which the data packet is to be passed on to this network node. In addition to those details which define a network node, the first routing statement, which is formed in the source network node, also, according to the invention, contains branching information, which indicates branches in the route, and one or more cross-references to further routing statements. Branching information and a cross-reference to a further routing statement are in this case always related to a specific network node. Branching information causes the network node to which it related to pass the data packet on to a number of network nodes, rather than to an individual network node. In contrast, a cross-reference for a network node to a further routing statement causes that network node to evaluate this further routing statement and to pass the data packet on to network nodes identified in this further routing statement.

The method according to the invention can be used particularly advantageously in heterogeneous communications networks, that is to say in communications networks having a number of differently structured subnetworks, such as the Internet. Specifically, in communications networks such as this, individual subnetworks often use routing methods which are specifically adapted to them and which are each dependent on different routing statements. One example of this is subnetworks which are designed for a label-switching method and whose routing devices require a sequence of identification records as routing statements for passing on data packets more quickly. Using a method according to the invention, routing statements which are advantageous for individual subnetworks can be taken into account or produced in the source network node itself, and can be included in the routing process via the first routing statement that is formed there. During route definition, a routing process can in many cases still be optimized by including a number of alternative routing statements.

The method according to the invention allows the advantages of very fast routing methods, based on a specifically adapted form of the routing statement, such as label-switching methods, to be transferred to a multicast transmission mode with explicit routing, as well.

A further advantage of the method according to the invention is that a data packet can also be transmitted to an individual destination network node or to an individual destination terminal without changing the algorithm on which the method according to the invention is based. Specifically, if the first routing statement, which is formed in the source network node, contains neither branching information nor any cross-reference to a further routing statement, the data bracket is transmitted to only one destination network node or one destination terminal.

Each routing statement can be allocated either to an individual data packet or to a number of data packets to be transmitted. While, in the former case, a dedicated routing statement must be transmitted for each data packet, for example in a packet header provided for this purpose, in the latter case, a routing statement need be transmitted only once for all the data packets which are associated with it and refer to it.

According to one advantageous development of the invention, a routing statement which is allocated to a number of data packets is—at least partially—transmitted along the route before these data packets in order to make preparations in network nodes along the route for the data packets, which are to be transmitted subsequently and which refer to this routing statement, to be passed on quickly. For this purpose, the relaying information which is required in order to pass these data packets on from this network node is read in each network node, from this routing statement or from its part which is in each case transmitted, and is stored in this network node such that it can be called up. When a data packet arrives later, this means that the stored relaying information for that routing statement to which this data packet refers is called up sequentially, and the data packet is passed on as a function of this routing statement. A reference in a data packet to a previously transmitted routing statement can be provided, for example, by means of allocation information which is transmitted with this data packet and refers to this routing statement.

In accordance with an added feature of the invention, by transmitting a connection setup message, routing information associated with the connection which is to be set up is in each case stored in network nodes, which receive such a message, the routing information denoting that network node from which the connection setup message was in each case received. The stored routing information is used to pass on in the direction of the source node data packets which are to be transmitted in the course of the connection, which is to be set up, from the destination network nodes and/or destination terminals to the source network node—that is to say in the direction opposite that in which the connection setup message is transmitted. Transmission of data packets from a number of data sources to a single transmission destination is frequently also referred to as "merging".

This can be implemented particularly easily if branching information is formed from branch information which indicates a branch in the route at a specific network node, and branch path end information which indicates the end of a respective route branch. The end of a route branch which branches further can in this case be defined, inter alia, as the end of the complete specification of the route branch in the routing statement. The branch information, for its part, can be represented by numerical information which indicates the number of network nodes between the branch and the end of the route branch as indicated by the branch path end information. In general, such numerical information can be inserted into the routing statement following associated branch path end information. In this case, the associated numerical information can be determined immediately after reading branch path end information, and it is thus possible to determine the number of network nodes through which it is necessary to count back, starting from the end of the route branch, in order to determine the network node at which the branch occurs. As an alternative to this, the branch information can be represented by reserved code information whose position within the routing statement marks a branch.

According to a further advantageous development of the invention, a further routing statement is produced in the source network node from an existing routing statement which has been allocated to a data packet, and is transmitted in association with the data packet. The further routing statement is in this case optimized for efficient evaluation of specific subregions of the communications network in the network nodes. For example, a sequence of identification records which is derived from the IP address and is intended for fast evaluation by means of a label-switching method can be added to a data packet which is received in the source network node for passing on to a destination network node or to a destination terminal and is provided only with an IP address. The data packet can thus be transmitted considerably more quickly in those subregions of the communications network which are located between the source network node and the destination network node or destination terminal and are designed for a label-switching method.

According to a further advantageous development, routing statements which are intended for evaluation in network nodes in a respective hierarchy level are produced in the source network node in communications networks having network nodes which are allocated to different hierarchy levels. In this case, different routing methods, which are advantageous for a respective hierarchy level, can be provided in different hierarchy levels. A route changeover from a first hierarchy level to a second hierarchy level can be initiated in a simple way by means of a cross-reference, which is inserted into a routing statement that is valid for the first hierarchy level, to a routing statement which is valid for the second hierarchy level.

Furthermore, routing statements can be produced in the source network node, and can be transmitted associated with a data packet, in which case these routing statements can each be evaluated efficiently in different subregions of the communications network. In a heterogeneous communications network which is composed of a number of differently structured subnetworks using different routing methods, for example, a routing statement optimized for a particular routing method can be produced for each routing method used in a respective subnetwork.

Other features which are considered as characteristic for the invention are set forth in the appended claims.

Although the invention is illustrated and described herein as embodied in a method for transmitting data packets to a number of receivers in a heterogeneous communications network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figures 1, 2:
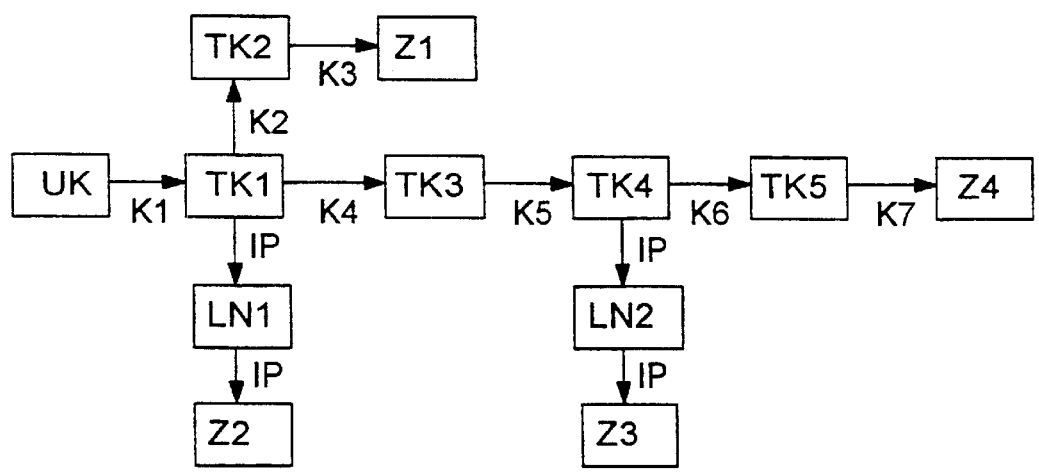
FIG. 1 is a schematic illustration of a data packet provided with a number of routing statements.
FIG. 2 is a block diagram of a switching sequence for data packets which are to be transmitted to a number of destination network nodes and destination terminals.

Referring now to the figures of the drawing in detail and first, particularly, to FIG. 1 thereof, there is seen a schematic illustration of a data packet with a user data area ND. The data packet is provided with a sequence of identification records as a first routing statement R1, and with an IP address IP as a second routing statement. The first routing statement R1 and the IP address IP are thereby intended for evaluation by means of respectively different routing methods. FIG. 1, for purposes of clarity, does not show additional information contained in a packet header of the data packet.

The fact that only two routing statements are to be transmitted with the data packet in this case should be regarded only as an example. It is intended to allow the following description of the exemplary embodiment to be simplified.

The first routing statement R1 contains one or more identification records for each of the network nodes which are involved in transmission of the data packet, and these identification records are used to define the output ports of a relevant network node via which the received data packet should in each case be passed on. Such identification records are often also referred to as port or link identifiers. In addition to the identification records which identify an output port, one method according to the invention also provides reserved identification records in order to indicate a route branch and as a cross-reference to another routing statement. The reserved identification records which indicate a route branch are represented in this exemplary embodiment by a parenthesis symbol "(" and ")" which will be referred to as a bracket in the following. Furthermore, a cross-reference to the IP address IP is represented by the combination "( )" of these bracket symbols, which otherwise has no meaning. Since, apart from the IP address IP, this exemplary embodiment does not provide any further routing statements to which it would be possible to produce a cross-reference from the first routing statement R1, this unspecified representation of a cross-reference is unambiguous, and is thus sufficient. If a greater number of routing statements were present, a cross-reference to another routing statement would need to have added to it information for unambiguous identification of the routing statement to which it refers.

The IP address IP which identifies a destination network node or a destination terminal can also be used for passing on the data packet in subregions of the communications network which are not designed for a method according to the invention. When the data packet moves to such a subregion, the first routing statement R1 is removed from the data packet, which is passed on using the Internet Protocol. In Version 6 of this Protocol (IPv6), the IP address IP can also identify a number of destination network nodes and/or destination terminals to which the data packet is then transmitted in parallel.

FIG. 2 shows an example of a switching sequence for the data packet which is to be transmitted from a source network node UK to a number of destination network nodes Z1, Z4 and destination terminals Z2, Z3. The transmission follows a route which leads from the source network node UK via transit network nodes TK1, ..., TK5 and local subnetworks LN1 and LN2 to the destination network nodes Z1, Z4 and to the destination terminals Z2, Z3. The drawing does not show any communications network nodes which are not involved in the transmission of the data packet. Before the data packet is transmitted, the route is determined in the source network node UK, for example by means of a conventional Dijkstra algorithm, as a function of the topology of the communications network, and is converted to a first routing statement R1 which describes the route.

Starting from the source network node UK, the data packet is passed on from network node to network node, as indicated by an arrow in each case. For the destination network nodes Z1 and Z4, the route in this case runs via the transit network nodes TK1, ..., TK5, which in each case evaluate identification records K1 ..., K7 in the first routing statement R1 in order to pass on the data packet. The associated arrow in each case indicates which of the identification records K1, ..., K7 in each case initiates the relaying process. In contrast, the destination terminals Z2 and Z3 in this exemplary embodiment can be accessed via the local subnetworks LN1 and LN2, respectively, which are not designed for evaluation of the first routing statement R1. In this case, the data packet is passed on—as is likewise indicated by the appropriate arrow—on the basis of the IP address IP.

In order that data packets without a first routing statement R1 containing identification records can also be transmitted through the communications network, a network node which is involved in the transmission process first of all checks whether a data packet also has such a first routing statement R1 allocated to it. If no allocated first routing statement is identified, the relevant data packet is passed on using the Internet Protocol.

The illustrated switching sequence is based on the following first routing statement R1, which is formed in the source network node UK and comprises 17 successive identification records:

K1,  (, ),
    (, K2, K3, ),
    (, K4, K5, (, ),
         (, K6, K7, ),
    ).

The individual identification records in this case are each represented separated from one another by commas. For clarity, the first routing statement R1 is shown distributed over a number of lines, with opening and closing bracket symbols for the same bracket level being tabulated in to the same extent.

Figure 3:
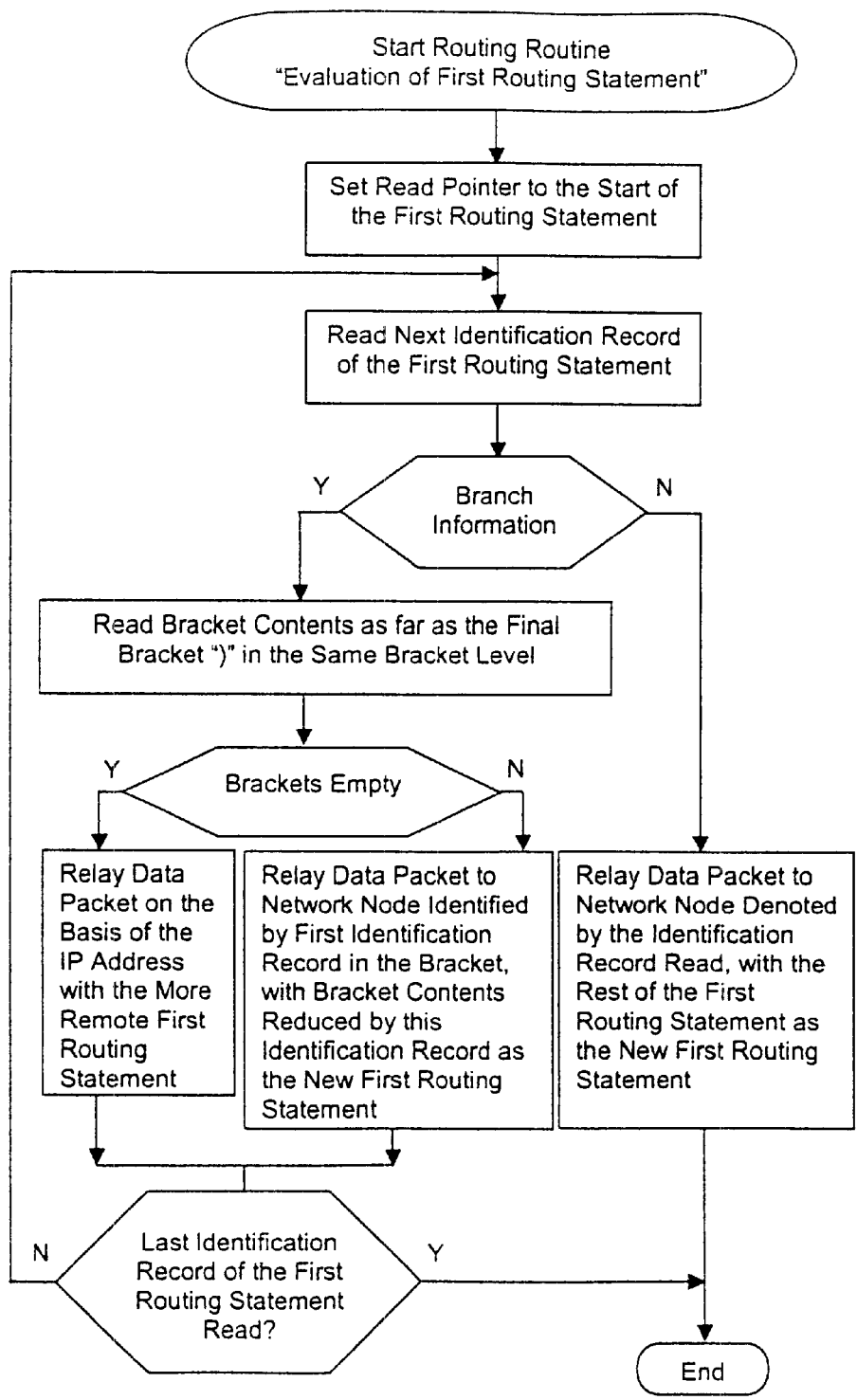
FIG. 3 shows a flowchart of a routing routine.

Referring now to FIG. 3, there is shown a flowchart of a routing routine which runs in each of the network nodes UK and TK1, ..., TK5, by means of which first routing statements allocated to data packets are evaluated and which are used to initiate appropriate relaying of the data packets.

The first identification record K1 in this first routing statement is read first of all by the routing routine in the source network node UK in the course of evaluation of the first routing statement R1 mentioned above. Since this identification record K1 represents information which identifies the transit network node TK1 (and not a branch information represented by an opening bracket), the data packet is then passed on to this transit network node TK1. In this case, the original, first routing statement is replaced by a subsequent, new, first routing statement which is to be transmitted with the data packet and is formed by removal of the already read identification record K1 from the original first routing statement R1:

(, ),
(, K2, K3, ),
(, K4, K5, (, ),
     (, K6, K7, ),
).

The first identification record is read first of all by the routing routine, which runs in the transit network node TK1 in the course of evaluation of this new, first routing statement, and is identified as branch information "(", with this routing statement then being read as far as the final bracket symbol ")" in the same bracket level. Since the first bracket is empty, this is interpreted as a cross-reference to the IP address IP. In consequence, a copy of the data packet is passed on using the IP address IP, but without the new first routing statement, to the local network LN1, which then uses the Internet Protocol to transmit the copy of the data packet to the destination terminal Z2 identified by the IP address IP.

After the closing bracket symbol, which is read last, branch information "(" is read once again as the next identification record. Bracket contents (in this case K2, K3) which are then read as far as a corresponding closing bracket symbol, are not empty, and are thus interpreted as partial routing information specifying a route branch. The first identification record (in this case K2) in the bracket contents in this case identifies the transit network node (in this case TK2), to which a copy of the data packet is to be transmitted. The bracket contents—in this case the identification record K3—but with the first identification record removed, are added as the routing statement to this copy of the data packet.

The next identification record read in the transit network node TK1 is also branch information "(". Analogously to the procedure described above, associated bracket contents are once again read in as far as a corresponding closing bracket symbol and—since this is not empty—are interpreted as partial routing information. On this occasion, the first identification record K4 of these bracket contents identifies the transit network node TK3 to which a copy of the data packet is thus likewise transmitted. Once again, the bracket contents—in this case the sequence "K5, (,), (,K6, K7,)"— from which its first identification record has been removed is added as the first routing statement to this copy.

The interpretation of the last bracket that is read completes the evaluation of the first routing statement transmitted to the transit network node TK1, thus completing the transmission of the data packet through this transit network node TK1. The data packet and/or its copies are then transmitted from the transit network nodes TK2 and TK3 via the transit network nodes TK4, TK5 and the local network LN2 to the destination network nodes Z1, Z4 and to the destination terminal Z3. The evaluation of a first routing statement received by each of the transit network nodes and the relaying of a data packet allocated to this first routing statement are in this case carried out in each of the transit network nodes TK1, . . . , TK5 involved using a procedure which is completely analogous to that described above.

I claim:

1. A method of transmitting a data packet in a communications network from a source network node to a plurality of destinations along a branching route specified by a number of routing statements provided for different routing methods, the method which comprises:

producing a first routing statement in a source network node, the first routing statement
having branching information for each branch in the route and having partial routing information, specifying the route branch, for each route branch of the given branch; and
containing a cross-reference to a further routing statement;

allocating the first routing statement to at least one data packet to be transmitted, and transmitting the first routing statement to network nodes immediately following the source network node on the route; and controlling with the routing statement the network node receiving the routing statement, with
branching information initiating transmission of a received data packet through network nodes denoted by the partial routing information allocated to a route branch and immediately following the branch, to which, furthermore, the respective partial routing information is transmitted, with or without information in each case denoting one of these nodes, as the routing statement, and
initiating, with the network node receiving the routing statement, a valuation of the further routing statement denoted by the cross-reference when a cross-reference relating to this network node is present, and the received data packet being passed on to network nodes or terminals denoted in the further routing statement.

2. The method according to claim 1, which comprises transmitting a routing statement allocated to a single data packet within a packet header of the data packet.

3. The method according to claim 1, which comprises, in a network node receiving a routing statement allocated to a plurality of given data packets before the given data packets, reading relaying information, for relaying the given data packets to be transmitted subsequently from the network node and referring to this routing statement, from this routing statement and storing the relaying information in the network node for later call-up, and calling up the stored relaying information when one of the given data packets referring to this routing statement arrives, and using the relaying information for relaying the data packet.

4. The method according to claim 1, which comprises referencing a data packet to a previously transmitted routing statement with allocation information, and transmitting the allocation information with the data packet and referring to the routing statement.

5. A method of transmitting a connection setup message in a communications network from a source network node to a plurality of destinations along a branching route specified by a plurality of routing statements provided for different routing methods, the method which comprises:

producing a first routing statement in a source network node, the first routing statement
having branching information for each branch in the route and having partial routing information, specifying the route branch, for each route branch of the relevant branch; and
containing a cross-reference to a further routing statement;

allocating the first routing statement to at least one connection setup message to be transmitted, and transmitting the first routing statement to network nodes immediately following the source network node on the route; and controlling a network node with the routing statement received thereby, wherein
branching information initiating transmission of a received connection setup message through network nodes denoted by the partial routing information allocated to a route branch and which immediately follow the branch, to which, furthermore, the respective partial routing information is transmitted, with or without information in each case denoting one of the nodes, as the routing statement, and wherein
the network node receiving the routing statement initiates a valuation of the further routing statement denoted by the cross-reference when a cross-reference relating to this network node is present, and the received connection setup message being passed on to network nodes or terminals denoted in the further routing statement.

6. The method according to claim 5, which comprises:
in a network node receiving a routing statement that is allocated to a plurality of connection setup messages and is transmitted before the connection setup messages, reading relaying information which is required in order to relay from this network node various connection setup messages which are to be transmitted subsequently and refer to this routing statement from this routing statement and storing in the network node for later call-up; and calling up the stored relaying information when a data packet that refers to the routing statement arrives, and using the relaying information for relaying the connection setup message.

7. The method according to claim 5, wherein a connection setup message refers to a previously transmitted routing statement with allocation information transmitted with the connection setup message and referring to the routing statement.

8. The method according to claim 5, wherein a connection setup message is contained in a data packet transmitted along the route of the network nodes, and the network nodes are caused to relay along the route data packets to be transmitted subsequently in the course of setting up the connection.

9. The method according to claim 5, wherein routing information of a connection to be set up which denotes that network node from which the connection setup message has in each case been received is allocated and stored in network nodes which receive a connection setup message, and wherein data packets to be transmitted from the destination network nodes and/or the destination terminals to the source network node in a course of the connection to be set up between the source network node and the destination network nodes and/or destination terminals are relayed by network nodes located on the route, using the routing information that is in each case stored there for this connection and indicates the direction to the source network node.

10. The method according to claim 1, wherein branching information comprises branching path end information indicating an end of a respective route branch, and branch information indicating a branch in one of the network nodes.

11. The method according to claim 10, wherein the branch information is represented by numerical information indicating a number of network nodes located between the branch and the end of the route branch.

12. The method according to claim 10, wherein the branch information is represented by reserved code information whose position within the routing statement marks a branch.

13. The method according to claim 1, which comprises:

producing in the source network node a further routing statement, optimized for efficient evaluation in network nodes in specific subregions of the communications network, from an existing routing statement; and making a reference to the further routing statement from another routing statement.

14. The method according to claim 1, which produces producing routing statements for evaluation by network nodes in a respective hierarchy level in the source network node in communications networks having network nodes in different hierarchy levels.

15. The method according to claim 14, which comprises inserting a cross-reference to a routing statement that is valid for a second hierarchy level into a routing statement that is valid for a first hierarchy level, for specifying a route leading from the first hierarchy level to the second hierarchy level.

16. The method according to claim 1, which comprises producing in the source network node routing statements that can each be efficiently evaluated by network nodes in different subregions of the communications network.

17. The method according to claim 16, which comprises inserting a cross-reference to a further routing statement into a routing statement such that, once the route has been transferred from one subregion of the communications network to another subregion, the routing statement, which can be evaluated more efficiently, is in each case evaluated by the relevant network nodes.

18. The method according to claim 1, wherein a cross-reference to a further routing statement is represented by branching information reserved for that purpose.

19. The method according to claim 1, wherein the communications network is an ATM network.

* * * * *